(12) United States Patent
Witherspoon

(10) Patent No.: US 12,475,637 B2
(45) Date of Patent: Nov. 18, 2025

(54) DIFFUSED LIGHT RENDERING OF A VIRTUAL LIGHT SOURCE IN A 3D ENVIRONMENT

(71) Applicant: APPLE INC., Cupertino, CA (US)

(72) Inventor: Noah A. Witherspoon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 18/124,755

(22) Filed: Mar. 22, 2023

(65) Prior Publication Data

US 2023/0290048 A1    Sep. 14, 2023

Related U.S. Application Data

(63) Continuation of application No. PCT/US2021/049199, filed on Sep. 7, 2021.
(Continued)

(51) Int. Cl.
*G06T 15/50* (2011.01)
*G06F 1/16* (2006.01)
(Continued)

(52) U.S. Cl.
CPC ............ *G06T 15/506* (2013.01); *G06F 1/163* (2013.01); *G06T 7/70* (2017.01); *G06T 15/20* (2013.01);
(Continued)

(58) Field of Classification Search
CPC ......... G06T 15/506; G06T 7/70; G06T 15/20; G06T 19/20; G06T 2219/2004; G06F 1/163
See application file for complete search history.

(56) References Cited

U.S. PATENT DOCUMENTS 10,169,917 B2 * 1/2019 Chen ........................ G06T 17/20
10,210,664 B1 * 2/2019 Chaturvedi ........ G06Q 30/0643
(Continued)

FOREIGN PATENT DOCUMENTS

| EP | 2973425 B1 * | 10/2019 | ........... G06T 15/005 |
| WO | 2017/072049 A1 | 5/2017 | |
| WO | 2018/224847 A2 | 12/2018 | |

OTHER PUBLICATIONS (PCT) European Patent Office (ISA/EP), International Search Report and Written Opinion of the International Searching Authority, International Application No. PCT/US2021/049199, 14 pages, Feb. 10, 2022.

*Primary Examiner* — Xin Sheng
(74) *Attorney, Agent, or Firm* — Thompson Hine LLP

(57) ABSTRACT

Various implementations disclosed herein include devices, systems, and methods that generate a depiction of a portion of a physical environment illuminated based on light provided by identified portions of a virtual light source. For example, an example process may include obtaining sensor data, generating a three-dimensional (3D) reconstruction based on the sensor data, positioning a virtual light source relative to the 3D reconstruction, identifying a portion of the virtual light source based on unobstructed paths between the portion of the physical environment and the virtual light source, associating the portion of the virtual light source with the portion of the physical environment, and generating a view that includes a depiction of a portion of a physical environment illuminated based on light provided by the identified portions of the virtual light source.

26 Claims, 8 Drawing Sheets

Related U.S. Application Data

(60) Provisional application No. 63/082,973, filed on Sep. 24, 2020.

(51) Int. Cl.
    *G06T 7/70*         (2017.01)
    *G06T 15/20*       (2011.01)
    *G06T 19/20*       (2011.01)

(52) U.S. Cl.
    CPC ...... *G06T 19/20* (2013.01); *G06T 2219/2004* (2013.01)

(56) References Cited

U.S. PATENT DOCUMENTS

| | | |
|---|---|---|
| 2015/0205351 A1 | 7/2015 | Osterhout et al. |
| 2015/0317825 A1* | 11/2015 | Hazel ............... G06T 15/06 345/426 |
| 2017/0017323 A1 | 1/2017 | Yu et al. |
| 2019/0188766 A1* | 6/2019 | Cho ............... H04L 67/12 |
| 2019/0250733 A1 | 8/2019 | Pelis et al. |
| 2020/0066001 A1 | 2/2020 | Harrison et al. |

* cited by examiner

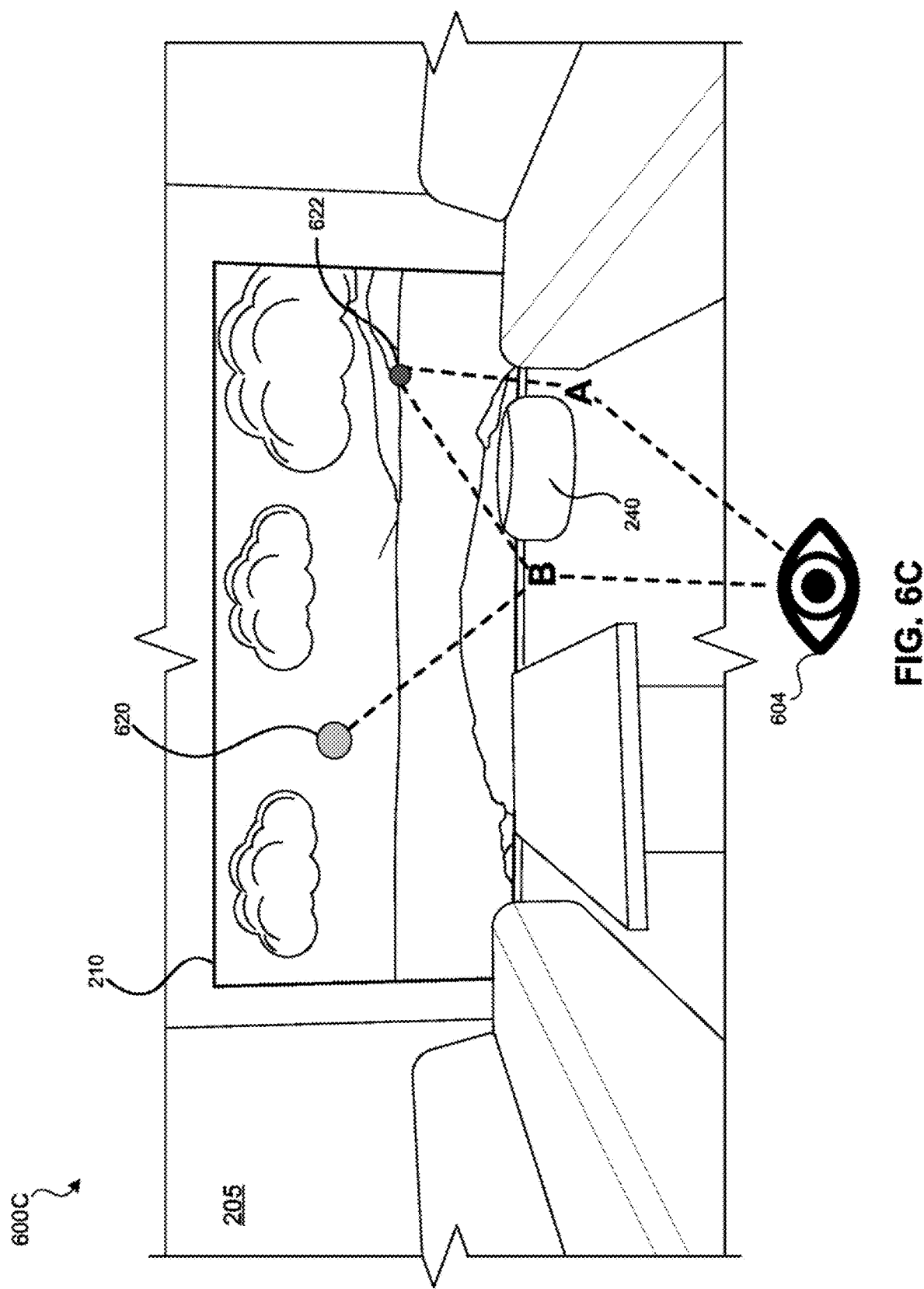

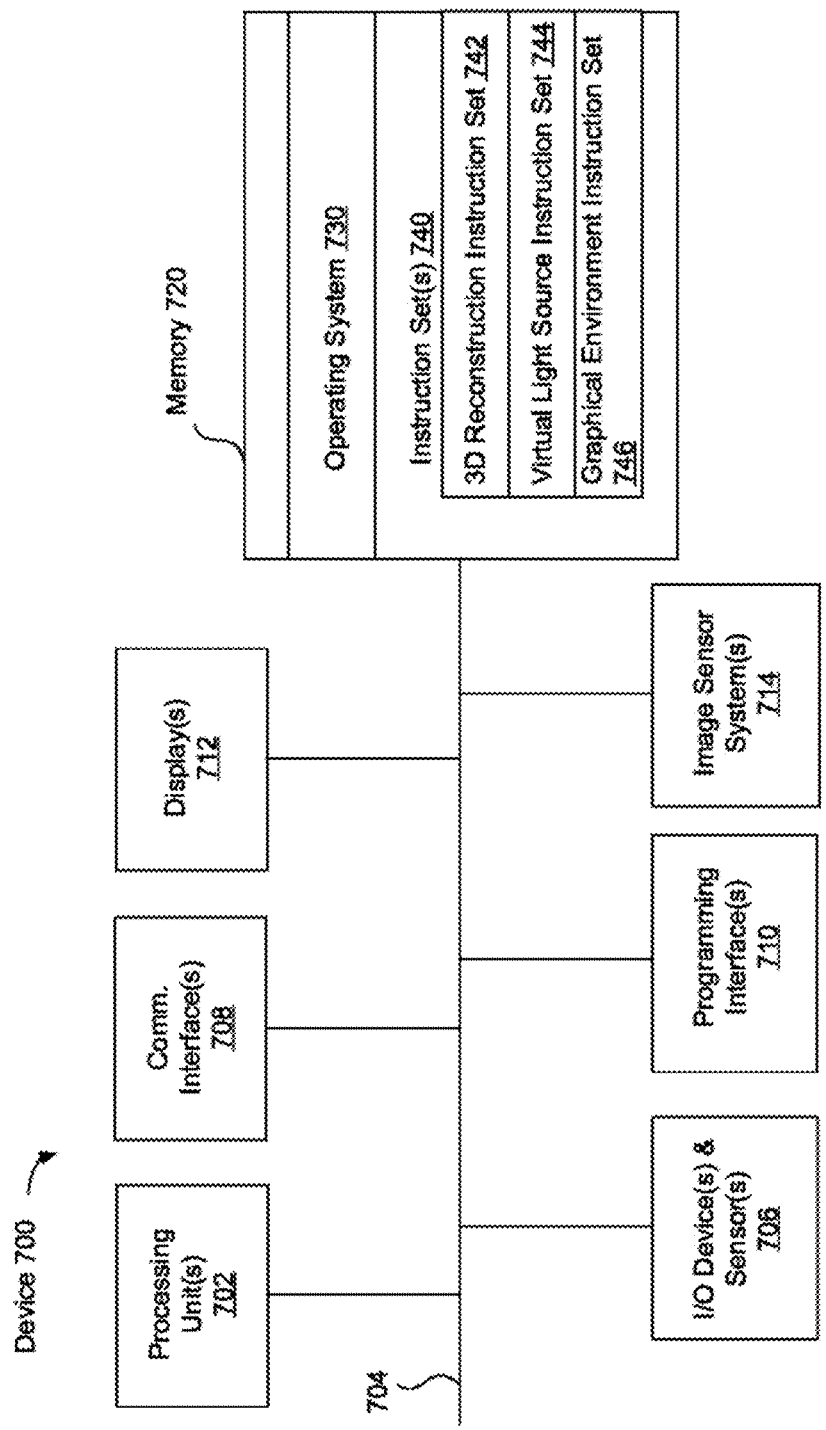

DIFFUSED LIGHT RENDERING OF A VIRTUAL LIGHT SOURCE IN A 3D ENVIRONMENT

CROSS-REFERENCE TO RELATED APPLICATIONS

This patent application is a continuation of International Application No. PCT/US2021/049199 filed on Sep. 7, 2021, entitled "DIFFUSED LIGHT RENDERING OF A VIRTUAL LIGHT SOURCE IN A 3D ENVIRONMENT," which claims the benefit of U.S. Provisional Application No. 63/082,973 filed on Sep. 24, 2020, entitled "DIFFUSED LIGHT RENDERING," each of which is incorporated herein by this reference in its entirety.

TECHNICAL FIELD

The present disclosure generally relates to adjusting illumination, and in particular, to systems, methods, and devices that adjusts illumination of an environment from a virtual light source.

BACKGROUND

Various electronic devices present users with extended reality (XR) environments. A person can use an electronic device to interact with and/or sense an extended reality (XR) environment that is wholly or partially simulated. An XR environment may include depictions of a physical environment. For example, XR can be video-see-through (e.g., in which the physical environment is captured by a camera and displayed on a display with additional content) or optical-see-through (e.g., in which the physical environment is viewed directly or through glass and supplemented with displayed content). An XR system may provide a user with a XR experience that integrates rendered three-dimensional (3D) graphics (e.g., virtual objects) into a live video stream of a physical environment captured by a camera.

Virtual objects in XR environments may be virtual light sources that emit virtual light. For a realistic or otherwise desirable appearance, such virtual light should affect the appearance of other objects (e.g., real objects and other virtual objects) and be obstructed by the other objects in the environment. For example, an object (e.g., an end table) may obstruct light from a virtual screen to another object (e.g., a couch). In some instances, it may be desirable to portray the illumination from a virtual light source realistically, for example, such that emitted virtual light is occluded by another object in the XR environment. Existing techniques for casting such light effects may have high processing requirements and may not achieve a realistic look and feel. Specifically, some conventional algorithms perform ray tracing for every frame, which requires a lot of rays and takes a long time to process. Thus, it may be desirable to provide a means of efficiently providing more realistic illumination from virtual sources in XR environments.

SUMMARY

Various implementations disclosed herein include devices, systems, and methods that illuminate a graphical environment that includes a depiction of a physical environment based on light from a virtual light source, e.g., lighting a depiction of a real-world sofa based on light from a virtual movie screen. In some implementations, the disclosure can utilize three-dimensional (3D) reconstruction to create a process for generating diffused light patterns in a virtual environment. For example, when 3D reconstruction is performed, the locations of a user's surrounding environment (e.g., wall and seat surfaces) can be determined by the device. The processes described herein can store diffused light data for each position within the 3D environment so that it can be easily accessed and updated for each frame in real time without having to constantly (e.g., in every frame) perform ray tracing when displaying virtual content. For example, the system may first trace rays from individual locations in the 3D environment and identify which parts of the light source (e.g., virtual TV screen) is visible and not occluded by an object, such as a chair, from the perspective of the individual locations. This association between location in the 3D space and part of the light source is stored for quick reference, for example, in a cache. The stored associations can be used to determine how to illuminate other objects based on light emitted from the light source over a period of time, e.g., for multiple frames. The amount, color, intensity, and other attributes of the light emitted from different portions of the light source may change over time. In some implementations, when the light source is emitting light, diffused light data can be calculated and rendered in the surrounding virtual environment by blending the colors currently displayed by part of the light source and aggregating the intensity of the light from the part of the light source associated with each location in the 3D environment. One advantage of such implementations is that there is an association between 3D positioning of locations within the 3D environment and portions of the light source that are visible at those locations in the 3D environment, such that the diffused light effect generated at each 3D location may be determined, at any given instant in time, as a function of the color of light and area of the portion the light source currently visible at that 3D location.

In general, one innovative aspect of the subject matter described in this specification can be embodied in methods that include the actions of, at an electronic device having a processor and memory, obtaining sensor data corresponding to a physical environment, generating a three-dimensional (3D) reconstruction of the physical environment based on the sensor data, positioning a virtual light source relative to the 3D reconstruction of the physical environment, identifying a portion of the virtual light source based on unobstructed paths between a portion of the physical environment and the virtual light source using the 3D reconstruction and a position of the virtual light source, associating, in the memory, the portion of the virtual light source with the portion of the physical environment, and generating a view including a depiction of the portion of the physical environment illuminated based on light defined by the associated portion of the virtual light source.

These and other embodiments can each optionally include one or more of the following features.

In some aspects, the association between the portion of the virtual light source and the portion of the physical environment is maintained until a movement of the device is detected to be above a threshold change (e.g., threshold distance or threshold rotation).

In some aspects, the method further includes detecting the movement of the electronic device in the physical environment, based on detecting the movement, identifying a second portion of the virtual light source for use in illuminating the portion of the physical environment, the second portion different than the first portion, and generating an additional view using the 3D reconstruction, the additional view including a depiction of the portion of the physical environment illuminated based on light defined by the associated second portion of the virtual light source.

In some aspects, the portion of the virtual light source is a two-dimensional portion. In some aspects, positioning the virtual light source relative to the 3D reconstruction of the physical environment includes identifying locations of wall structures and objects in the physical environment based on the 3D reconstruction, and positioning the virtual light source relative to the identified locations of the wall structures and the objects of the physical environment. In some aspects, the virtual light source is a virtual multimedia screen.

In some aspects, the portion of the physical environment includes a first and a second object and identifying the portion of the virtual light source is based on the unobstructed paths between the portion of the physical environment and the virtual light source includes determining that the second object obstructs light from the identified portion of the virtual source to a portion of the first object, and determining that the portion of the first object can receive unobstructed light from other portions of the virtual light source.

In some aspects, the portion of the first object is determined based on a location of the portion of the first object is closer to a location of the virtual light source relative to other portions of the first object.

In some aspects, the method further includes rendering a virtual object in the view of the graphical environment, wherein the virtual object is depicted in the view based on light provided by associating a portion of the virtual light source for use in illuminating a portion of the virtual object.

In some aspects, the view of the graphical environment is rendered live during streaming of the sensor data. In some aspects, the sensor data includes depth data and light intensity image data obtained during a scanning process. In some aspects, the electronic device is a head-mounted device (HMD).

In some aspects, the graphical environment is an extended reality (XR) experience that is presented to the user. In some aspects, the graphical environment is a mixed reality (MR) experience that is presented to the user.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A, 6B, 6C illustrate example presentations of a view of an object with respect to light from a light source accordance with some implementations.

FIG. 7 is an example device in accordance with some implementations.

Figure 1:
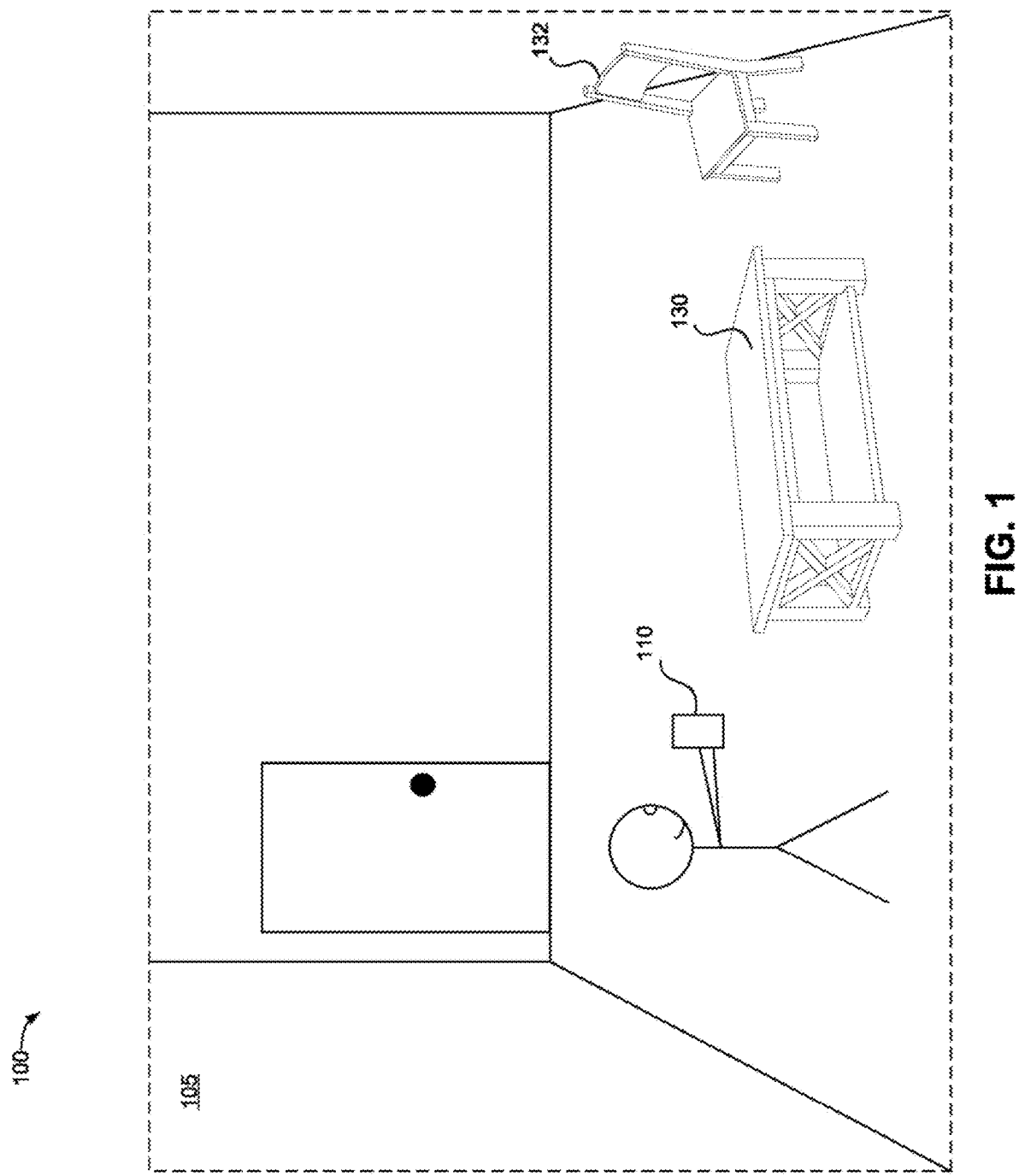
FIG. 1 is an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a simplified diagram of an example operating environment 100 in accordance with some implementations. In this example, the example operating environment 100 illustrates an example physical environment 105 that includes a table 130 and a chair 132. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head. As such, the device 110 may include one or more displays provided to display content. The device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

According to some implementations, the device 500 (e.g., device 110 of FIG. 1) may generate and present an extended reality (XR) environment to their respective users. A person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 2:
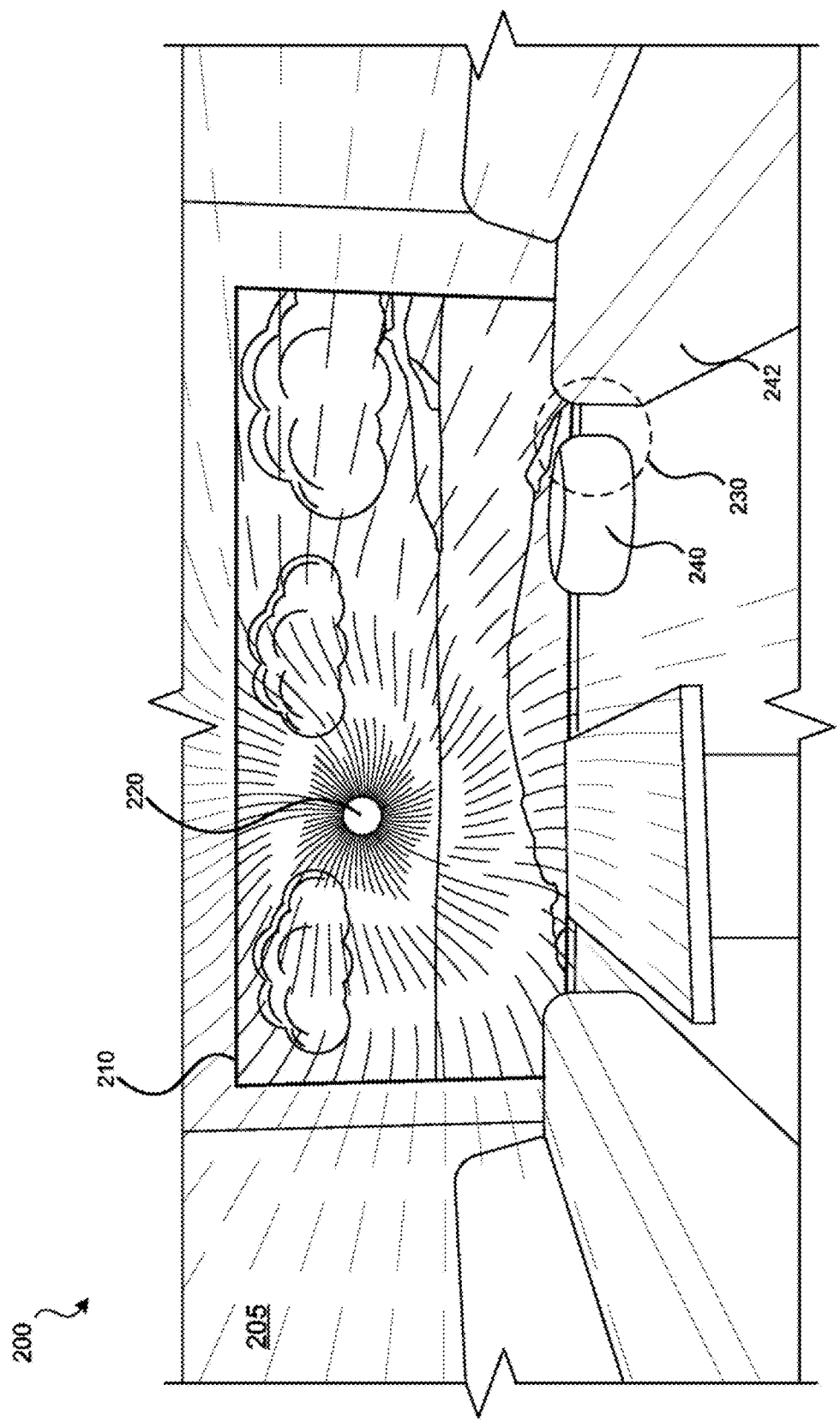
FIG. 2 illustrates an example of presenting a representation of illumination within a graphical environment based on light from a virtual light source in accordance with some implementations.

FIG. 2 illustrates an example environment 200 that presents a representation of illumination within a graphical environment that includes a depiction of a physical environment (e.g., physical environment 105 of FIG. 1) based on light from a virtual light source in accordance with some implementations. In particular, environment 200 illustrates illumination from a virtual screen 210 onto a physical environment (or a 3D representation of a physical environment), within a graphical environment 205. For example, the graphical environment 205 is a view from a user wearing an HMD in their living room (e.g., the physical environment) watching a virtual screen (e.g., a virtual TV screen that is depicted within the living room). The view of the physical environment may be video-see-through (e.g., in which the physical environment is captured by a camera and displayed on a display with additional content) or optical-see-through (e.g., in which the physical environment is viewed directly or through glass and supplemented with displayed additional content). In this particular example, the content from virtual screen 210 is a brighter scene (e.g., a bright sunny day) with a central location of a light source 220 within the scene (e.g., a sun). According to techniques described herein, the virtual light source system can determine, based on the 3D reconstruction data of the physical environment, that some light rays from the virtual screen 210 (e.g., in particular as depicted as light rays from the light source 220), to the couch 242 are blocked behind the end table 240 at area 230. Thus, while the user is fully immersed in the environment 200, the illumination effects from the content on the virtual screen 210 become more realistic and therefore more appealing while wearing an HMD.

Figure 3:
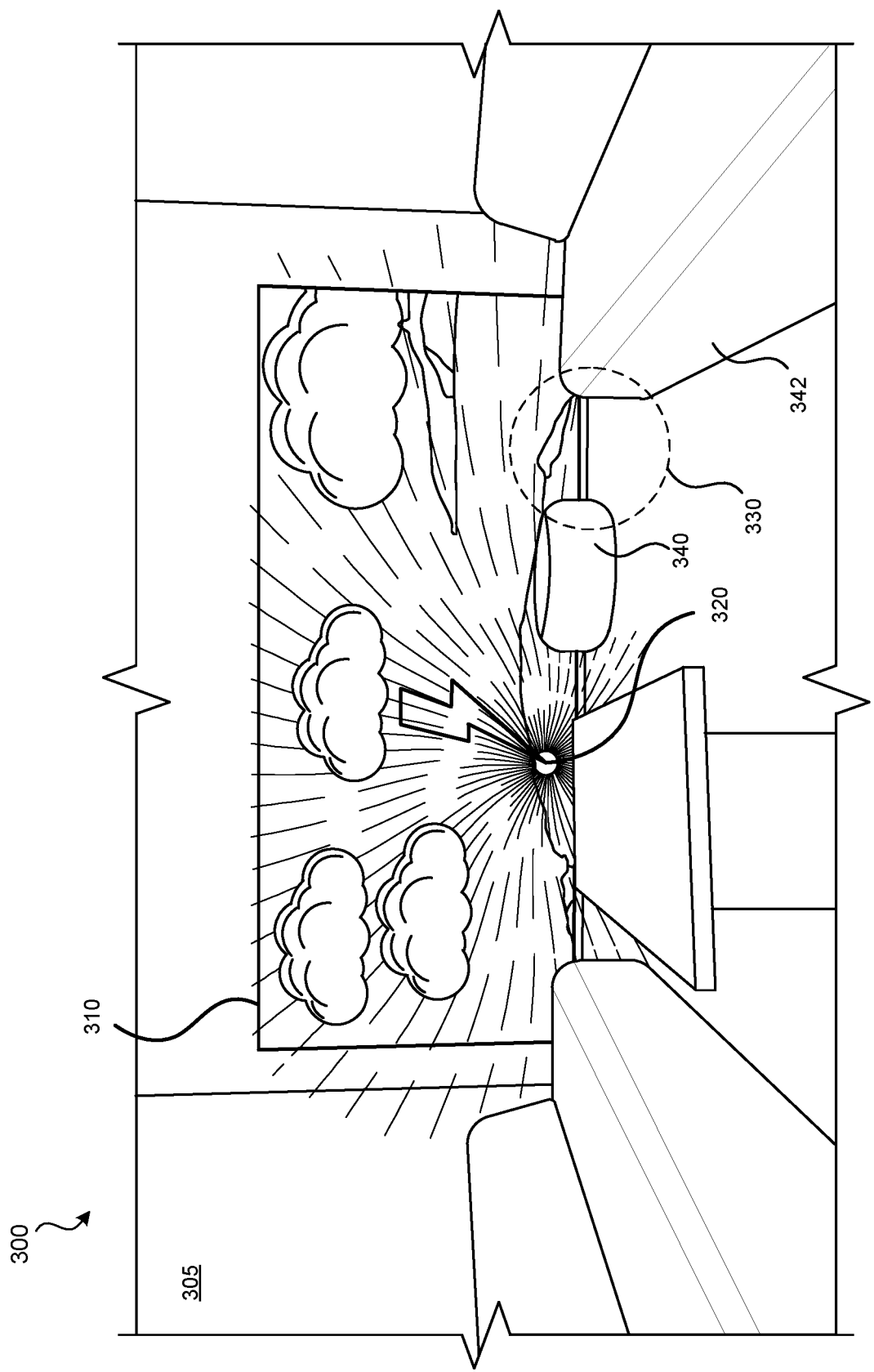
FIG. 3 illustrates an example of presenting a representation of illumination within a graphical environment based on light from a virtual light source in accordance with some implementations.

FIG. 3 illustrates an example environment 300 that presents a representation of illumination within a graphical environment that includes a depiction of a physical environment (e.g., physical environment 105 of FIG. 1) based on light from a virtual light source in accordance with some implementations. In particular, environment 300 illustrates illumination from a virtual screen 310 onto a physical environment (or a 3D representation of a physical environment), within a graphical environment 305. For example, the graphical environment 305 is a view from a user wearing an HMD in their living room (e.g., the physical environment) watching a virtual screen (e.g., a virtual TV screen that is depicted within the living room). The view of the physical environment may be video-see-through (e.g., in which the physical environment is captured by a camera and displayed on a display with additional content) or optical-see-through (e.g., in which the physical environment is viewed directly or through glass and supplemented with displayed additional content). In this particular example, the content from virtual screen 310 is a dark scene (e.g., a dark and stormy night) with a central location of a light source 320 within the scene (e.g., a lightning strike). According to techniques described herein, the virtual light source system can determine, based on the 3D reconstruction data of the physical environment, that some light rays from the virtual screen 310 (e.g., in particular as depicted as light rays from the light source 320—a lightning strike), to the couch 342 are blocked behind the end table 340 at area 330. Thus, while the user is fully immersed in the environment 300, the illumination effects from the content on the virtual screen 310 (e.g., the lightning strike during a dark scene) become more realistic and therefore more appealing while wearing an HMD.

Figure 4:
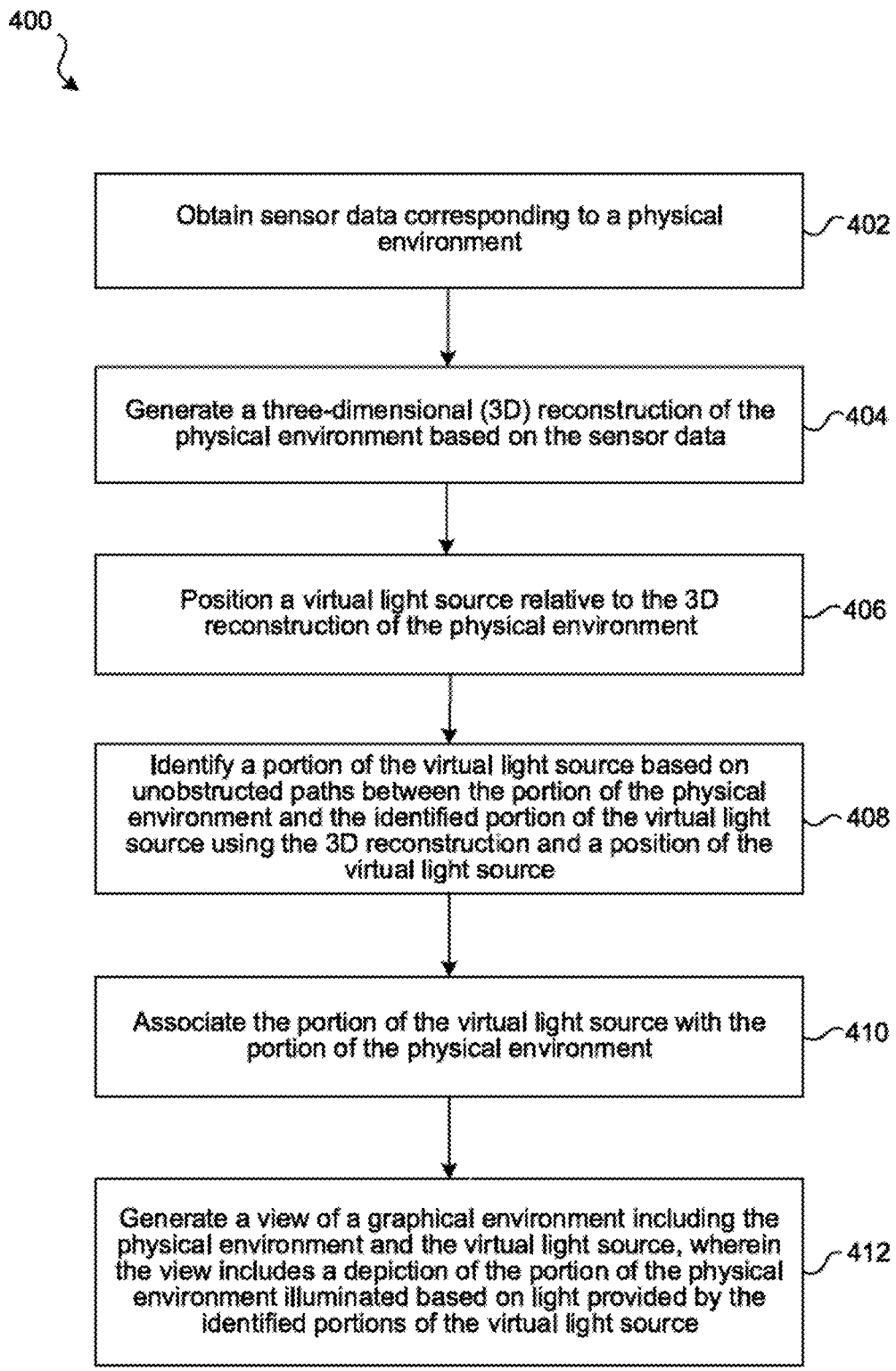
FIG. 4 is a flowchart representation of an exemplary method that illuminates a graphical environment that includes a depiction of a physical environment based on light from a virtual light source in accordance with some implementations.

FIG. 4 is a flowchart representation of an exemplary method 400 that illuminates a graphical environment that includes a depiction of a physical environment based on light from a virtual light source in accordance with some implementations. In some implementations, the method 400 is performed by a device (e.g., device 110 of FIG. 1), such as a mobile device, head-mounted device (HMD), desktop, laptop, or server device. In some implementations, the method 400 is performed by processing logic, including hardware, firmware, software, or a combination thereof. In some implementations, the method 400 is performed by a processor executing one or more instruction sets stored in a non-transitory computer-readable medium (e.g., a memory).

At block 402, the method 400 obtains sensor data corresponding to a physical environment. The sensor data may include light intensity image data (e.g., a sequence of RGB image frames). The sensor data may further include depth data (e.g., reflectivity data) acquired from a depth sensor (e.g., depth sensor data from a LIDAR sensor, time-of-flight sensor, an IR-based depth sensor, or the like). For example, a user may use sensor(s) on a device (e.g., cameras) to acquire image data of a physical environment (e.g. physical environment 105 of FIG. 1).

At block 404, the method 400 generates a three-dimensional (3D) reconstruction of the physical environment based on the sensor data. The 3D reconstruction may be a 3D model (e.g., a 3D mesh representation, a 3D point cloud with associated semantic labels, or the like). In some implementations, generating a 3D reconstruction may include a computer-vision depth analysis.

At block 406, the method 400 positions a virtual light source relative to the 3D reconstruction of the physical environment. In some implementations, the virtual light source is a virtual multimedia screen. For example, a virtual screen (e.g., virtual screen 210 of FIG. 2) may be positioned in a fixed position relative to the physical environment's walls, furniture, etc. (e.g., physical environment 205). Additionally, the virtual screen may have a lower left portion, a center portion, an upper right portion, etc. that may be used to identify portions of the screen that may illuminate particular portions of the physical environment. For example, a bright light from a bottom right portion of the virtual screen (e.g., a flash light pointing outwards from the virtual screen towards a user watching the screen) may illuminate a portion of the physical environment that is proximate to the bottom right portion of the virtual screen.

In some implementations, positioning the virtual light source relative to the 3D reconstruction of the physical environment includes identifying locations of wall structures and objects in the physical environment based on the 3D reconstruction, and positioning the virtual light source relative to the identified locations of the wall structures and the objects of the physical environment.

At block 408, the method 400 identifies a portion of the virtual light source based on unobstructed paths between a portion of the physical environment and the identified portions of the virtual light source using the 3D reconstruction and a position of the virtual light source. A portion pf the virtual light source may be identified based on unobstructed paths between a portion of the physical environment and the identified portion of the virtual light source. For example, this may involve identifying that from an armrest corner point on the sofa light from the upper left portion, upper right portion, and lower right portion of the virtual screen can be received. It may further involve identifying that a virtual or real coffee table blocks light from the lower left portion of the virtual screen and thus that portion of the virtual light source is not identified.

At block 410, the method 400 associates the portion of the virtual light source with the portion of the physical environment. Associations between areas of the physical environment and visible regions of the virtual light source may be stored in memory. For example, the armrest corner point on the sofa is now associated to receiving light from the upper left portion, the upper right portion, and the lower right portion of the virtual screen. In some implementations, once the association of the portion of the virtual light source with the portion of the physical environment has been processed, then an updated association is not needed for each new frame of the obtained sensor data. Thus, when the device is not moving, the does not need to update which portions are associated with the physical points in space. In some implementations, if a detection is made that the device has moved, the system can then update the association. Additionally, or alternatively, the association may be processed at a particular interval of time (e.g., update the association every 20 seconds). In some implementations, the portion of the physical environment includes a first object and a second object (e.g., end table 540 and couch 542 of FIG. 5) that may create some obstruction of light from the virtual screen. Thus, the method 400 may further involve determining that the second object obstructs light from one of the identified portions of the virtual source to a portion of the first object (e.g., corner of couch 542 is blocked by the end table 540 in FIG. 5). Additionally, the method 400 may further involve determining that the portion of the first object can receive unobstructed light from other portions of the virtual light source. For example, determining that a portion of the corner of the sofa is obstructed from getting light from the bottom right corner of the virtual screen, but also determining that the portion of the corner of the sofa could receive light from a top right portion of the virtual screen.

At block 412, the method 400 generates a view including a depiction of the portion of the physical environment illuminated based on light defined by the associated portion of the virtual light source. For example, the view may include the armrest corner point with an appearance determined based on the color/texture of the point that is adjusted based on virtual light received from the identified portions of the virtual screen. Generating the view may involve generating a view of a graphical environment including the physical environment and the virtual light source.

In some implementations, the method 400 further involves rendering a virtual object (e.g., a computer-generated object) in the view of the graphical environment, wherein the virtual object is depicted in the view based on light provided by identifying portions of the virtual light source for use in illuminating a portion of the virtual object. In one example, computer-generated content is illuminated similar to real world objects, e.g., light from a computer-generated light source such as a virtual screen can be shown as blocked by a real-world object such as a piece of furniture.

In some implementations, the view of the graphical environment is rendered live during streaming of the sensor data. For example, live streaming of an event, such as a basketball game. In other words, the system rendering the realistic illumination from the virtual screen is not able to receive (e.g., know) what is coming next during the event, as opposed to a streaming movie where a system could possibly look at frames ahead of time to determine the illumination that may be about to come in the current (live) frame.

In some implementations, the graphical environment is an extended reality (XR) environment that is presented to the user. In one example, the entire experience of watching a virtual screen is within a fully immersive XR environment while wearing an HMD. In some implementations, the graphical environment is a mixed reality (MR) experience that is presented to the user. For example, the screen is virtual and the corresponding illumination from the virtual screen is virtual, but the remaining environment is the physical environment, either from video-see-through (e.g., in which the physical environment is captured by a camera and displayed on a display with additional content) or optical-see-through (e.g., in which the physical environment is viewed directly or through glass and supplemented with displayed additional content).

Figure 5:
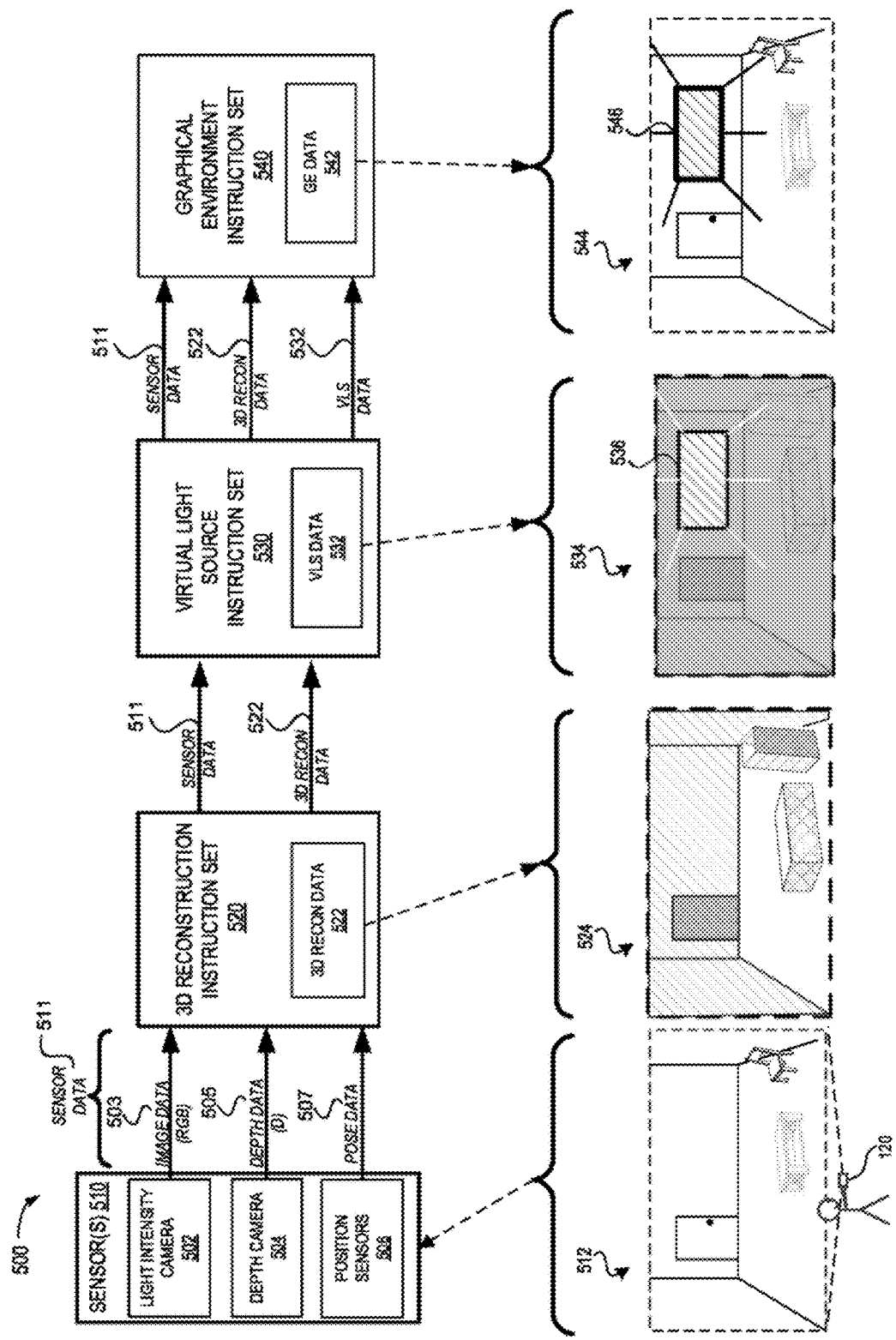
FIG. 5 illustrates a system flow diagram that can illuminate a graphical environment that includes a depiction of a physical environment based on light from a virtual light source in accordance with some implementations.
Figure 6A:
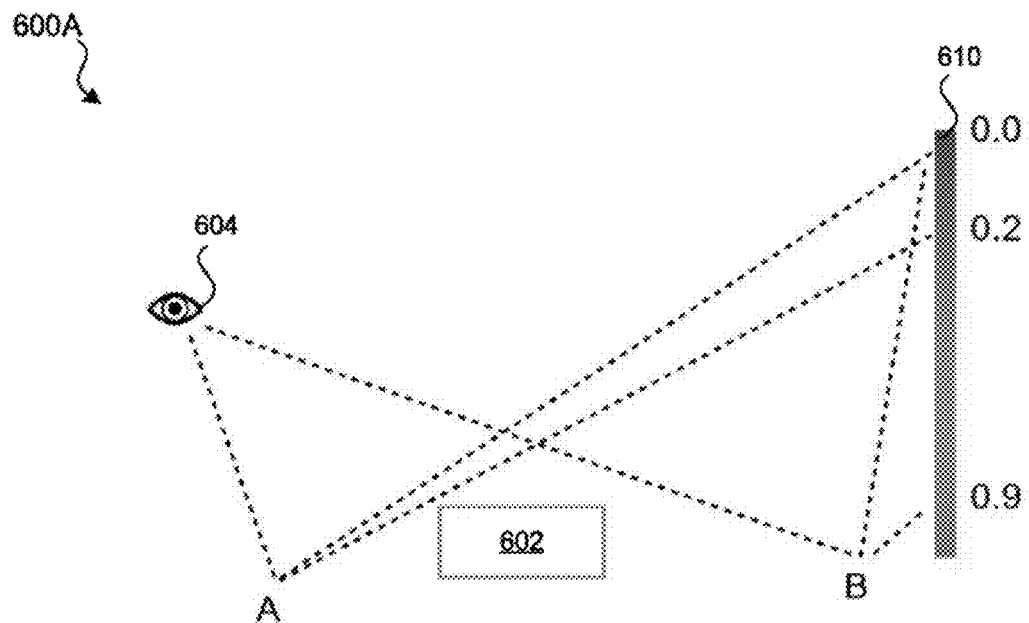
Figure 6B:
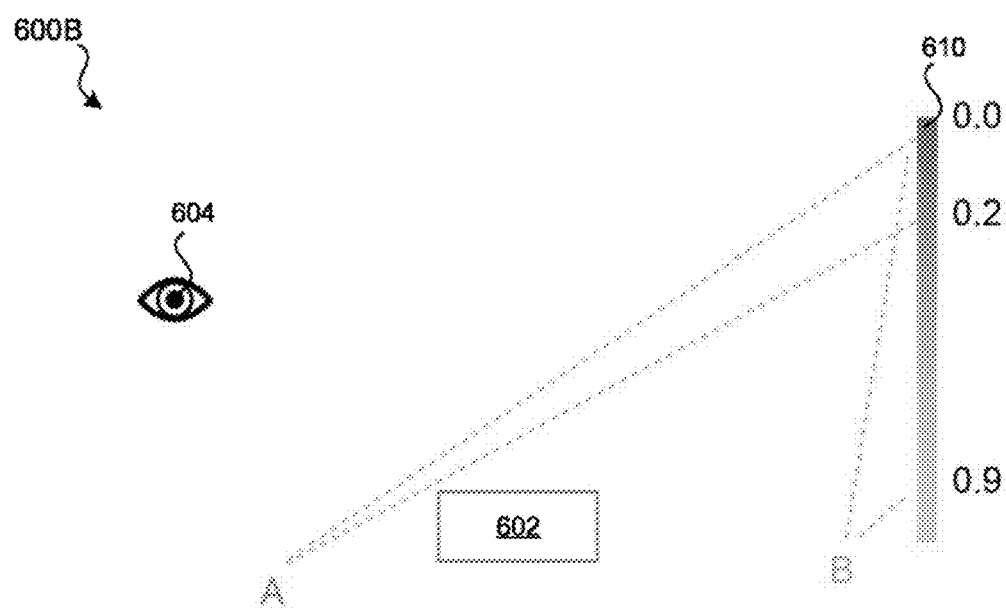

The illumination of a depiction of a physical environment based on light provided by the associated portion of a virtual light source is further described herein with reference to FIGS. 5-6. In particular, FIG. 5 illustrates a system flow diagram for acquiring image data, generating 3D reconstruction data, generating virtual light source data, and generating graphical environment data in accordance with techniques described herein. FIGS. 6A-6C illustrate determining visibility and identifying light changes in accordance with techniques described herein.

FIG. 5 is a system flow diagram of an example environment 500 in which a system can illuminate a graphical environment that includes a depiction of a physical environment based on light from a virtual light source according to some implementations. In some implementations, the system flow of the example environment 500 is performed on a device (e.g., device 110 of FIG. 1), such as a mobile device, head-mounted device (HMD), desktop, laptop, or server device. In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires image data from sensors of a physical environment (e.g., the physical environment 105 of FIG. 1). The system flow generates 3D reconstruction data, assesses the 3D reconstruction data and acquired image data to determine virtual light source data. Additionally, the system flow assesses the 3D reconstruction data, acquired image data, and the virtual light source data to generate graphical environment data that includes the physical environment (or a 3D representation thereof) and the virtual light source. The view includes a depiction of a portion of the physical environment illuminated based on light provided by the associated portion of the virtual light source. For example, a generating graphical environment data that includes virtual light source data technique described herein can be implemented on real-time images that are streamed to the end user (e.g., a live event).

In an example implementation, the environment 500 includes an image composition pipeline that acquires or obtains data (e.g., image sensor data 511 from image source (s) such as sensors 510) of the physical environment. Example environment 500 is an example of acquiring image sensor data (e.g., light intensity data, depth data, and position information) for a plurality of image frames. For example, image 512 represents a user acquiring image data as the user scans a room in a physical environment (e.g., the physical environment 105 of FIG. 1). The image source(s) may include a depth camera 504 that acquires depth data 505 of the physical environment, a light intensity camera 502 (e.g., RGB camera) that acquires light intensity image data 503 (e.g., a sequence of RGB image frames), and position sensors 506 to acquire positioning information. For the positioning information 507, some implementations include a visual inertial odometry (VIO) system to determine equivalent odometry information using sequential camera images (e.g., light intensity data 503) to estimate the distance traveled. Alternatively, some implementations of the present disclosure may include a SLAM system (e.g., position sensors 506). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 500 includes a 3D reconstruction instruction set 520 that is configured with instructions executable by a processor to generate 3D reconstruction data 522 from sensor data 511. For example, the 3D reconstruction instruction set 520 acquires sensor data 511 from sensors 510 such as light intensity image data 503 (e.g., live camera feed such as RGB from light intensity camera 502), depth image data 505 (e.g., depth image data such as depth from depth camera 504), and other sources of physical environment information (e.g., camera positioning information 507 such as position and orientation data, e.g., pose data, from position sensors 506) of a physical environment (e.g., the physical environment 105 of FIG. 1), and generates 3D reconstruction data 522 (e.g., a 3D mesh representation, a 3D point cloud with associated semantic labels, or the like). For example, the 3D reconstruction representation 524 represents 3D reconstruction of the physical environment 105 of FIG. 1 and can include a 3D mesh for the environment with objects identified (e.g. the table 130 and chair 132 are included within a 3D bounding box).

Alternatively, in some implementations, the system 500 may obtain the 3D reconstruction data 522 from another source. In some implementations, instead of a utilizing the 3D reconstruction instruction set 520 to generate the 3D reconstruction data 522 from obtained image data (e.g., from sensors (510) of a device, such as device 110 of FIG. 1), the system 500 may obtain the 3D reconstruction data from another system. For example, a user's living room may have already been scanned and reconstructed so the current system doesn't need to continually reconstruct the living room if the user is watching a virtual screen in the same room. Alternatively, if the user does need to get up and move around to a different room, or if furniture is moved around within the room during viewing (e.g., an additional person comes into the physical room to watch the virtual screen in front of the first user, such as on a bean bag chair closer to the screen), then the 3D reconstruction instruction set 520 could be utilized to generate the 3D reconstruction data 522 in real-time.

In an example implementation, the environment 500 includes a virtual light source instruction set 530 that is configured with instructions executable by a processor to obtain image sensor data and 3D reconstruction data and generate virtual light source data, which includes a virtual screen, using one or more techniques disclosed herein. For example, the virtual light source instruction set 530 obtains 3D reconstruction data (e.g., 3D reconstruction data 522 of a physical environment such as the physical environment 205 of FIG. 2) from the 3D reconstruction data instruction set 520 (or from another source) and sensor data 511 from image sensors 510 and generates virtual light source data 532. For example, the virtual light source instruction set 530 can generate a virtual screen 536 as illustrated in image 534, and the virtual illumination data generated from the virtual screen 536 (e.g., as depicted with example light rays projecting out from the virtual screen 536 in image 534 and as illustrated in FIGS. 2 and 3). For example, the virtual light source instruction set 530, using techniques described herein, can identify a portion of the virtual light source based on an unobstructed path between the portion of the physical environment and the virtual light source using the 3D reconstruction and a position of the virtual light source and associate. For example, identifying that from an armrest corner point on the sofa (e.g., couch 242 in FIG. 2) light from the upper left portion, upper right portion, and lower right portion of the virtual screen (e.g., virtual screen 210) can be received, the virtual or real coffee table (e.g., end table 240) may block light from the lower left portion and thus that portion of the virtual light source is not associated. This virtual light source illumination generation process of example environment 500 is further described herein with reference to FIGS. 2-3.

In an example implementation, the environment 500 includes a graphical environment instruction set 540 that is configured with instructions executable by a processor to obtain image sensor data, 3D reconstruction data, and virtual light source illumination data and generate graphical environment data (e.g., a computer-generated mixed reality environment) using one or more techniques disclosed herein. For example, the graphical environment instruction set 540 obtains 3D reconstruction data 522 (e.g., 3D reconstruction data 522 of a physical environment such as the physical environment 105 of FIG. 1) from the 3D reconstruction data instruction set 520 (or from another source), sensor data 511 from image sensors 510, and virtual light source data 532 from the 3D virtual light source instruction set 530 and generates graphical environment data 542. For example, the graphical environment instruction set 540 can generate a graphical environment (e.g., a virtual screen within a physical environment or a 3D representation thereof) as illustrated in image 544, and the virtual illumination data (e.g., virtual light source data 532) generated from the virtual screen 546 (e.g., as depicted with example light rays projecting out from the virtual screen 546 in image 534). For example, the graphical environment instruction set 540, using techniques described herein, can generate a view including a depiction of the portion of the physical environment illuminated based on light provided by the associated portion of the virtual light source (e.g., identifying which portions of an object may block light from the virtual screen onto another object—occlusion). For example, the user sees a view that includes the armrest corner point with an appearance determined based on the color/texture of the point that is adjusted based on virtual light received from the associated portion of the virtual screen. This virtual light source illumination generation process within a graphical environment of example environment 500 is further described herein with reference to FIGS. 2-3.

FIGS. 6A-6C illustrate example presentations of a view of an object with respect to light from a light source accordance with some implementations. In particular, FIG. 6A is an example environment 600A that illustrates determining visibility from a user's perspective (represented by the eye 604) from points A and B to the light source 610 (e.g., a virtual screen such as virtual screen 210 in FIG. 2) when there is an object 602 in the environment, according to techniques described herein. For example, which parts of the virtual screen can be "seen" from each point A and B. In some implementations, the visibility data is accumulated as visibility samples over time (e.g., amortization). In other words, the computing budget might only allow tracing a certain number of rays per frame, so each frame the system might only trace one ray for point A and one for point B, each to randomly-chosen places on the light source 610. For example, rays that reached the light source without being blocked by an object (e.g., object 602) would get added to the point's list of visible locations. For instance, for point A, the system can sequentially choose locations 0.0, 0.9, and 0.2 on the light source, where 0.0 would reach its destination uninterrupted and be added to A's list, 0.9 would be blocked by an obstacle (e.g., object 602) and would not be added to the list, and 0.2 would reach its destination, and thus would be added to the list. The result of this iterative process over time would be point A having a list of samples (e.g., up to some fixed number, to avoid unbounded growth in memory) containing values from 0.0 to 0.2, since that's the only region of the light point A can "see". Additionally, point B would have a list of samples spanning a broader area (e.g., 0.0-1.0), since it can "see" the entirety of the light from the light source 610. In some implementations, storing the number of samples for each point up to a fixed number may be based on a prioritization scheme to determine which samples to keep given memory constraints. For example, a prioritization scheme may be based on proximity to the surface (e.g., for point B, the sample at position 0.9 would have greater influence than the one at position 0.0). Additionally, or alternatively, the prioritization scheme may be based on other factors such as the angle between the surface at a point A or B, and the light source 610.

FIG. 6B is an example environment 600B that illustrates determining color (e.g., at a real-time frame rate) from a user's perspective (represented by the eye 604) with respect to a light source 610 (e.g., a virtual screen such as virtual screen 336 in FIG. 3) when there is an object 602 in the environment according to techniques described herein. For example, several light rays can be traced from the light source 610 where the light source includes identified locations on the screen (e.g., 0.0, 0.2, 0.9, and the like). For determining what color blends of illumination from the light source 610 are viewed by the user, environment 600B illustrates that point A gets blend of content colors from locations 0.0 and 0.2, and point B gets a blend of colors from locations 0.0 and 0.9. When content on the light source is updated (e.g., the content on the virtual screen changes from frame-to-frame such as a different colored environment), the system does not need to trace additional rays. Instead, the system still interprets point A as receiving a blend of content colors from location 0.0 and 0.2, and point B receives a blend of colors from location 0.0 and 0.9 on a frame-to-frame basis. Thus, having the visibility data allows the system to compute the final image (e.g., the color illumination) under changing conditions "for free" without additional raytracing.

In some implementations, the process of illumination of a depiction of a physical environment based on light from a virtual light source can also be used to focus on the identification of light intensity at points A and B. For example, each location of light source 610 can have a certain intensity of light (e.g., can be the same amount of intensity for each location of the screen). The light intensity for point A or B is an aggregation of the light intensities for each location of the light source 610 that is visible from the respective point A or B. For example, points in physical space that can "see" larger regions of the light source can have a higher intensity of light illumination.

FIG. 6C is an example environment 600C (e.g., physical environment 205 of FIG. 2) that illustrates determining visibility from a user's perspective (represented by the eye 604) from points A and B to the light source (e.g., light source 620 and light source 622 on virtual screen 210) when there is an object (e.g., end table 240) in the environment, according to techniques described herein. Environment 600C provides a similar example as environment 600A, but from the perspective as shown in environment 200 of FIG. 2. For example, which parts of the virtual screen 210 (e.g., light source 620 and light source 622) can be "seen" from each point A and B with respect to the user. In some implementations, the visibility data is accumulated as visibility samples over time (e.g., amortization). In other words, the computing budget might only allow tracing a certain number of rays per frame, so each frame the system might only trace one ray for point A and one for point B, each to randomly-chosen places on the virtual screen 210. For example, rays that reached the light source 620 without being blocked by an object (e.g., end table 240) would get added to the point's list of visible locations. For instance, for point A, the system can sequentially choose locations only from the light source 622, where light from light source 620 would be blocked by an obstacle (e.g., end table 240) and would not be added to the list, and light from light source 620 would reach its destination, and thus would be added to the list. The result of this iterative process over time would be point A having a list of samples (e.g., up to some fixed number, to avoid unbounded growth in memory) containing values from light source 622, since that's the only region of the light point A can "see". Additionally, point B would have a list of samples spanning a broader area, since it can "see" light from light source 620 and light source 622.

FIG. 7 is a block diagram of an example device 700. Device 700 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, CPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 700 includes a single display. In another example, the device 700 includes a display for each eye of the user.

In some implementations, the one or more image sensor systems 714 are configured to obtain image data that corresponds to at least a portion of the physical environment 105. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a 3D reconstruction instruction set 742, a virtual light source instruction set 744, and a graphical environment instruction set 746. The instruction set(s) 740 may be embodied as a single software executable or multiple software executables.

The 3D reconstruction instruction set 742 (e.g., 3D reconstruction instruction set 320 of FIG. 3) is executable by the processing unit(s) 702 to generate 3D reconstruction data (e.g., 3D reconstruction data 322 of FIG. 3). For example, the 3D reconstruction instruction set 742 obtains sensor data (e.g., sensor data 311 of a physical environment such as the physical environment 105 of FIG. 1) and generates 3D reconstruction data (e.g., a 3D mesh representation, a 3D point cloud with associated semantic labels, or the like) using techniques described herein.

The virtual light source instruction set 744 (e.g., virtual light source instruction set 330 of FIG. 3) is executable by the processing unit(s) 702 to generate virtual light source data (e.g., virtual light source data 332 of FIG. 3). For example, the virtual light source instruction set 744 obtains sensor data (e.g., sensor data 311 of a physical environment such as the physical environment 105 of FIG. 1) and 3D reconstruction data (e.g., 3D reconstruction data 322 of a physical environment such as the physical environment 105 of FIG. 1) and generates virtual light source data (e.g., virtual light source 332) using techniques described herein.

The graphical environment instruction set 746 (e.g., graphical environment instruction set 340 of FIG. 3) is executable by the processing unit(s) 702 to generate graphical environment data (e.g., graphical environment data 342 of FIG. 3). For example, the graphical environment instruction set 746 obtains sensor data (e.g., sensor data 311 of a physical environment such as the physical environment 105 of FIG. 1), 3D reconstruction data (e.g., 3D reconstruction data 322 of a physical environment such as the physical environment 105 of FIG. 1), and virtual light source data (e.g., virtual light source data 332), and generates graphical environment data (e.g., graphical environment data 342) using techniques described herein.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    at an electronic device having a processor and memory:
        obtaining sensor data corresponding to a physical environment;
        generating a three-dimensional (3D) reconstruction of the physical environment based on the sensor data;
        positioning a virtual light source relative to the 3D reconstruction of the physical environment;
        identifying a first portion of the virtual light source that is unobstructed and a second portion of the virtual light source that is obstructed based on identifying whether paths between a portion of the physical environment and the virtual light source are unobstructed or obstructed using the 3D reconstruction and positions of the first portion and the second portion of the virtual light source;
        in accordance with identifying the first portion and the second portion of the virtual light source, determining to illuminate the portion of the physical environment based only on light from the first portion of the virtual light source; and
        generating a view comprising a depiction of the portion of the physical environment illuminated based on light from the first portion of the virtual light source.

2. The method of claim 1, wherein illuminating the portion of the physical environment is maintained until a movement of the electronic device is detected to be above a threshold change.

3. The method of claim 2, wherein the portion of the virtual light source comprises a first portion, the method further comprising:

detecting the movement of the electronic device in the physical environment;

based on detecting the movement, identifying a second portion of the virtual light source for use in illuminating the portion of the physical environment, the second portion different than the first portion; and generating an additional view using the 3D reconstruction and the virtual light source, wherein the additional view comprises a depiction of the portion of the physical environment illuminated based on light defined by the identified second portion of the virtual light source.

4. The method of claim 1, wherein the portion of the virtual light source is a two-dimensional portion.

5. The method of claim 1, wherein positioning the virtual light source relative to the 3D reconstruction of the physical environment comprises:

identifying locations of wall structures and objects in the physical environment based on the 3D reconstruction; and positioning the virtual light source relative to the identified locations of the wall structures and the objects of the physical environment.

6. The method of claim 1, wherein the virtual light source is a virtual multimedia screen.

7. The method of claim 1, wherein the portion of the physical environment includes a first and a second object, wherein identifying the portion of the virtual light source is based on unobstructed paths between the portion of the physical environment and the identified portion of the virtual light source comprises:

determining that the second object obstructs light from the identified portion of the virtual source to a portion of the first object; and determining that the portion of the first object can receive unobstructed light from other portions of the virtual light source.

8. The method of claim 7, wherein the portion of the first object is determined based on a location of the portion of the first object is closer to a location of the virtual light source relative to other portions of the first object.

9. The method of claim 1, further comprising rendering a virtual object in the view, wherein the virtual object is depicted in the view based on light provided by associating a portion of the virtual light source for use in illuminating a portion of the virtual object.

10. The method of claim 1, wherein the view is rendered live during streaming of the sensor data.

11. The method of claim 1, wherein the sensor data comprises depth data and light intensity image data obtained during a scanning process.

12. The method of claim 1, wherein the electronic device is a head-mounted device (HMD).

13. The method of claim 1, wherein the view comprises an extended reality (XR) experience that is presented to a user.

14. The method of claim 1, wherein the view comprises a mixed reality (MR) experience that is presented to a user.

15. The method of claim 1, wherein the view comprising the depiction of the portion of the physical environment is generated for a period of time and includes a plurality of successive frames, wherein, for each frame of the plurality of successive frames, only pixels that are unobstructed are illuminated.

16. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining sensor data corresponding to a physical environment;

generating a three-dimensional (3D) reconstruction of the physical environment based on the sensor data;

positioning a virtual light source relative to the 3D reconstruction of the physical environment;

identifying a first portion of the virtual light source that is unobstructed and a second portion of the virtual light source that is obstructed based on identifying whether direct points between a portion of the physical environment and the virtual light source are unobstructed or obstructed using the 3D reconstruction and positions of the first portion and the second portion of the virtual light source;

in accordance with identifying the first portion and the second portion of the virtual light source, determining to illuminate the portion of the physical environment based only on light from the first portion of the virtual light source; and generating a view comprising a depiction of the portion of the physical environment illuminated based on light from the first portion of the virtual light source.

17. The device of claim 16, wherein illuminating the portion of the physical environment is maintained until a movement of the device is detected to be above a threshold change.

18. The device of claim 17, wherein the portion of the virtual light source comprises a first portion, and wherein the instructions, when executed on the one or more processors, further cause the device to perform operations comprising:

detecting the movement of the device in the physical environment;

based on detecting the movement, identifying a second portion of the virtual light source for use in illuminating the portion of the physical environment, the second portion different than the first portion; and generating an additional view using the 3D reconstruction, the additional view comprising a depiction of the portion of the physical environment illuminated based on light defined by the identified second portion of the virtual light source.

19. The device of claim 16, wherein the portion of the virtual light source is a two-dimensional portion.

20. The device of claim 16, wherein positioning the virtual light source relative to the 3D reconstruction of the physical environment comprises:

identifying locations of wall structures and objects in the physical environment based on the 3D reconstruction; and positioning the virtual light source relative to the identified locations of the wall structures and the objects of the physical environment.

21. The device of claim 16, wherein the virtual light source is a virtual multimedia screen.

22. The device of claim 16, wherein the portion of the physical environment includes a first and a second object, wherein identifying a portion of the virtual light source is based on the direct points between the portion of the physical environment and the identified portion of the virtual light source comprises:

determining that the second object obstructs light from the identified portion of the virtual source to a portion of the first object; and determining that the portion of the first object can receive unobstructed light from other portions of the virtual light source.

23. The device of claim 22, wherein the portion of the first object is determined based on a location of the portion of the first object is closer to a location of the virtual light source relative to other portions of the first object.

24. The device of claim 16, wherein the operations further comprise:
rendering a virtual object in the view, wherein the virtual object is depicted in the view based on light provided by associating a portion of the virtual light source for use in illuminating a portion of the virtual object.

25. The device of claim 16, wherein the view is rendered live during streaming of the sensor data.

26. A non-transitory computer-readable storage medium, storing program instructions executable by one or more processors to perform operations comprising:
obtaining sensor data corresponding to a physical environment;
generating a three-dimensional (3D) reconstruction of the physical environment based on the sensor data;
positioning a virtual light source relative to the 3D reconstruction of the physical environment;
identifying a first portion of the virtual light source that is unobstructed and a second portion of the virtual light source that is obstructed based on identifying whether paths between a portion of the physical environment and the virtual light source are unobstructed or obstructed using the 3D reconstruction and positions of the first portion and the second portion of the virtual light source;
in accordance with identifying the first portion and the second portion of the virtual light source, determining to illuminate the portion of the physical environment based only on light from the first portion of the virtual light source; and
generating a view comprising a depiction of the portion of the physical environment illuminated based on light from the first portion of the virtual light source.

* * * * *